S. VANSTONE.
Caster.

No. 215,996. Patented May 27, 1879.

WITNESSES:
Joseph A. Miller
William L. Coop

INVENTOR:
Samuel Vanstone
by Joseph A. Miller
Attorney

UNITED STATES PATENT OFFICE.

SAMUEL VANSTONE, OF PROVIDENCE, RHODE ISLAND, ASSIGNOR OF ONE-HALF OF HIS RIGHT TO JOHN A. TILLINGHAST, OF SAME PLACE.

IMPROVEMENT IN CASTERS.

Specification forming part of Letters Patent No. 215,996, dated May 27, 1879; application filed June 7, 1878.

*To all whom it may concern:*

Be it known that I, SAMUEL VANSTONE, of the city and county of Providence, and State of Rhode Island, have invented certain new and useful Improvements in Furniture-Casters; and I hereby declare that the following is a full, clear, and exact description thereof, reference being had to the accompanying drawings, forming part of this specification.

This invention has reference to improvements in furniture-casters; and consists in the peculiar manner in which the axial stud is made in one piece with the base-plate and forms a fixture in the furniture, not turning in a case, as has been usual heretofore.

It further consists in providing a deep recess on the base-plate, in which loose rolls, preferably punched blanks, form anti-friction rolls, and into which recess the circular plate formed at the upper end of the shank of the horns enters, thus securing a long bearing on the pin and a firm base, on which the anti-friction rolls and the weight rest, all of which will be set forth hereinafter, and pointed out in the claim.

Figure 1:
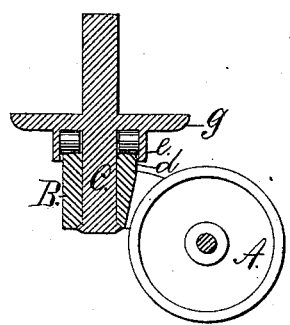
Figure 2:
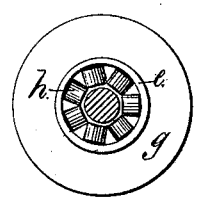
Figure 3:
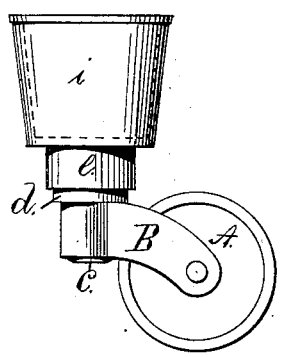
Figure 4:
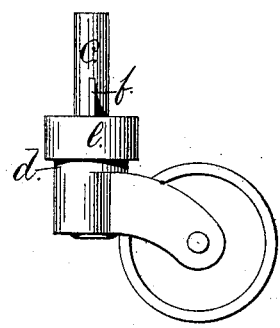
Figure 5:

Figure 1 is a sectional view of my improved furniture-caster, showing the axial stud on which the roller-bracket turns, the base-plate, and the fixed pin, which enters the furniture. Fig. 2 is a plan view of the base-plate, showing the disposition of the rolls. Fig. 3 is a view of a caster for chairs, provided with a cup, but otherwise constructed like Fig. 1. Fig. 4 is a view of a caster in which the upper pin is provided with lugs to prevent the turning of the same in the furniture. Fig. 5 is an enlarged sectional view of one of the rolls, showing the convex side at the larger and the concave side at the smaller diameter, to insure the rolling of the same around the central pin with the least friction.

In the drawings, A represents the caster-pulley; B, the bracket, provided with a shank, through which the pin C passes and on which it turns. *d* is the upper circular boss, extending into the recess formed by the projecting rim *e*. *f* is a lug, placed on the pin C when the base-plate *g* is dispensed with. *h h* are tapering rolls, made, preferably, to secure cheapness, of stamped blanks of metal, the inner portion being made concave to prevent friction on the central spindle, and the outer portion convex to prevent contact with the periphery of the rolls and the rim *e*. Such tapering rolls, with convex outer side and concave inner side, will roll around the central pin and within the outer rim with less friction than parallel rolls with straight sides, and secure a firmer and better bearing than globular or ball-shaped rolls.

In some kinds of furniture-casters a cup is preferable to a pin, and the cup *i* (shown in Fig. 3) is used.

By extending the pin C, on which the caster-bracket with the roller turn, into the furniture, and making the pin and the recess for receiving the rolls in one piece, a stronger and cheaper caster is produced than was heretofore possible, and a smaller hole is required, therefore injuring the furniture less than a larger or turning pin would.

Having thus described my invention, I claim as new and desire to secure by Letters Patent—

A furniture-caster consisting, essentially, in the combination, with the flange *e*, base-plate *g*, and pin C, cast solid in single piece, of the bracket-sleeve B, of sufficient thickness to closely fit within the annular recess between flange *e* and pin C, and sheet-metal rollers *h*, formed with concavo-convex faces, and arranged to have a rolling bearing on the upper edge of bracket B, the concave face of said rollers bearing against pin C, while their convex faces bear against the flange *e*, substantially as set forth.

SAMUEL VANSTONE.

Witnesses:
JOSEPH A. MILLER,
JOSEPH A. MILLER, Jr.